United States Patent [19]

Fiorentino

[11] Patent Number: 4,521,360

[45] Date of Patent: Jun. 4, 1985

[54] METHODS OF COMPACTION BY INCREMENTAL RADIAL COMPRESSION AND/OR LOW-RATIO EXTRUSION

[75] Inventor: Robert J. Fiorentino, Worthington, Ohio

[73] Assignee: Battelle Memorial Institute, Columbus, Ohio

[21] Appl. No.: 531,077

[22] Filed: Sep. 12, 1983

[51] Int. Cl.³ .............................................. B29D 3/02
[52] U.S. Cl. ..................................... 264/108; 72/253.1; 72/264; 72/273; 72/273.5; 264/60; 264/109; 264/323; 425/78
[58] Field of Search ................. 264/60, 108, 109, 323; 425/78; 72/253.1, 264, 273, 273.5

[56] References Cited

U.S. PATENT DOCUMENTS

| | | | |
|---|---|---|---|
| 2,123,416 | 7/1938 | Graham | 72/253.1 |
| 3,220,199 | 11/1965 | Hänlein et al. | 72/273 |
| 3,432,295 | 12/1969 | Frank et al. | 264/60 |
| 3,559,271 | 2/1971 | Nilsson | 72/273.5 |
| 3,620,059 | 11/1971 | Nilsson | 72/253.1 |
| 3,723,109 | 3/1973 | Lacock et al. | 72/273 |
| 3,805,574 | 4/1974 | Wessel | 72/253.1 |
| 4,051,706 | 10/1977 | Sakamoto et al. | 72/253.1 |
| 4,059,896 | 11/1977 | Asari et al. | 72/253.1 |
| 4,087,893 | 5/1978 | Sata et al. | 72/253.1 |
| 4,110,084 | 8/1978 | Lee et al. | 264/60 |
| 4,154,893 | 5/1979 | Goldman | 264/25 |
| 4,186,586 | 2/1980 | Takamura et al. | 72/264 |

FOREIGN PATENT DOCUMENTS 0515576  8/1955  Canada ............................. 72/253.1

OTHER PUBLICATIONS

"High-Temperature Hydrostatic Extrusion", Mar. 1971, vol. 66, No. 3, Manufacturing Engineering & Management, p. 16.
The Iron Age, May 25, 1967, p. 82.

Primary Examiner—Jeffery Thurlow
Assistant Examiner—Patrick Dailey
Attorney, Agent, or Firm—Robert B. Watkins

[57] ABSTRACT

A process of consolidating and compacting unconsolidated particulate materials such as powders with or without short fibers to a density of about one hundred percent by carrying out the process in a can or tube which is moving through a convergent die having an angle of convergence of less than 90°.

18 Claims, 11 Drawing Figures

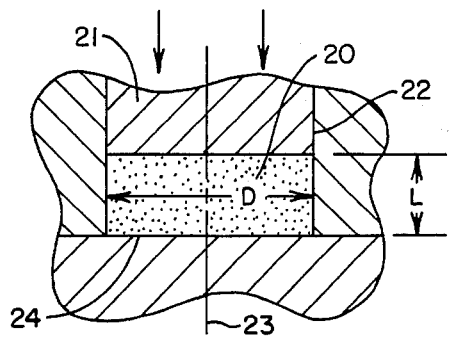
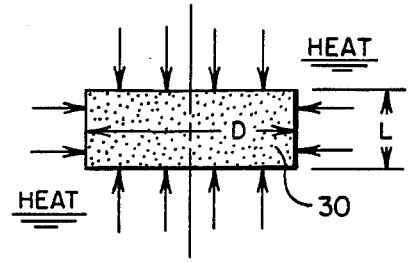
FIG. 1  PRIOR ART
FIG. 2  PRIOR ART
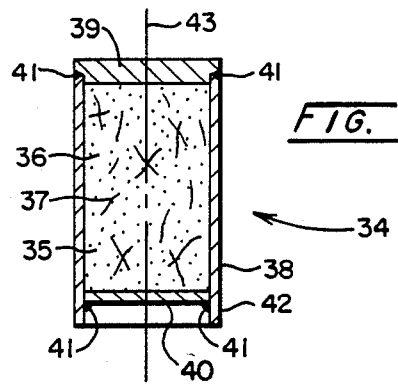
FIG. 3
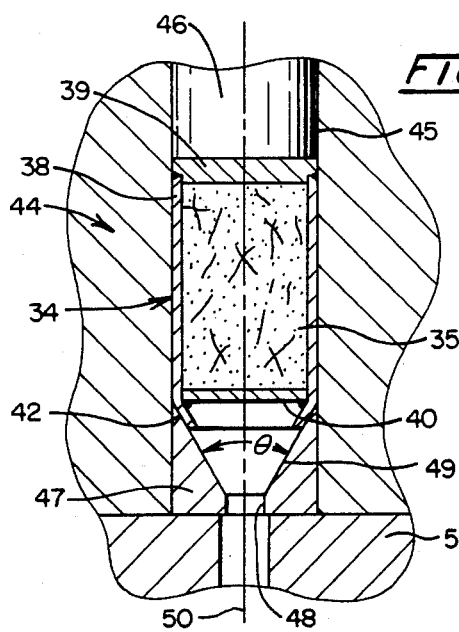
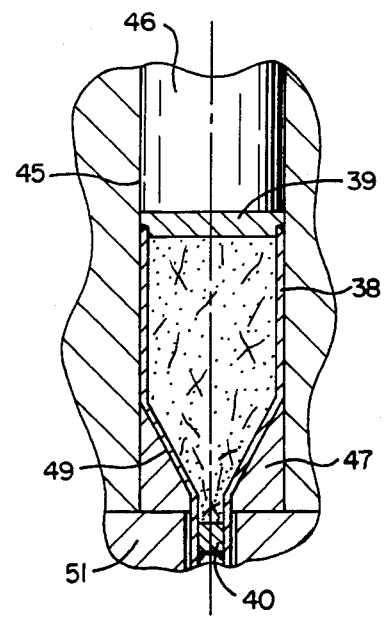
FIG. 4
FIG. 5

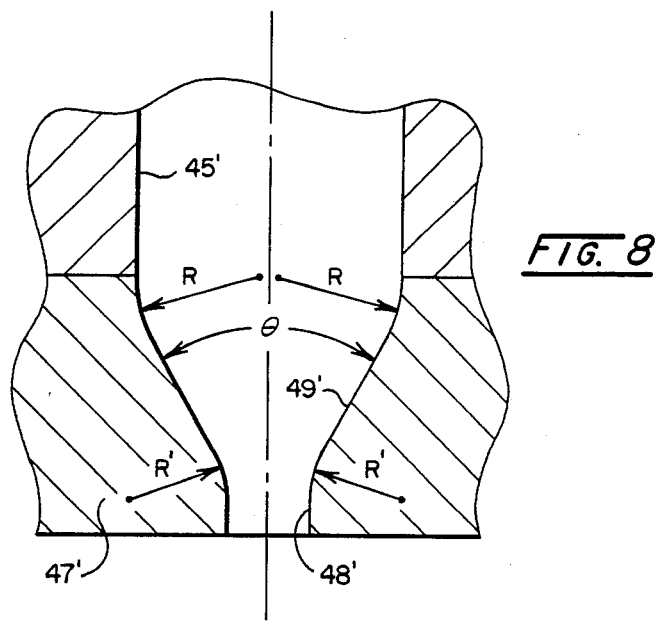
FIG. 8
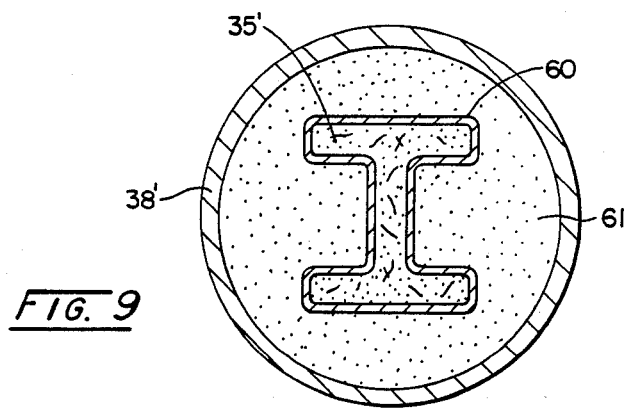
FIG. 9
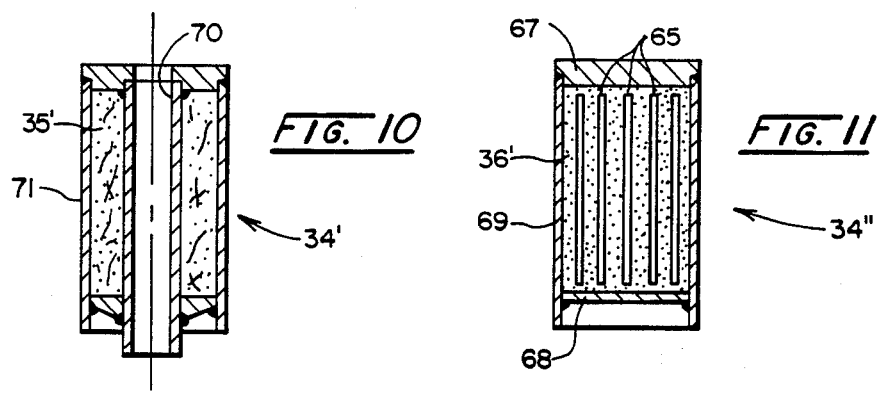
FIG. 10
FIG. 11

METHODS OF COMPACTION BY INCREMENTAL RADIAL COMPRESSION AND/OR LOW-RATIO EXTRUSION

FIELD OF THE INVENTION

This invention relates to a method of compacting particulates consisting of one material, or a plurality of materials (composites), some of which may be fibers of high length-to-diameter ratio; and more particularly it relates to effecting this compaction by incremental radial compression or low-ratio extrusion of a can around the uncompacted or partially-compacted particulate material while moving the can through a convergent die. The particulates may be metallic, ceramic, or polymeric materials.

BACKGROUND OF THE INVENTION

It is well known to use particulates for extrusion products. In the conventional practice, the particulates may be preformed or pressed into billets by various processes such as hot- or cold-isostatic pressing and mechanical-die pressing, and the billets are then extruded. The results of these processes are billets that may be at substantially one hundred percent theoretical density, which are thereafter inserted in an extrusion press and extruded through a die having a cross-sectional shape in the aperture which is the mating form to the desired final product.

Another prior practice combines the steps of compressing the powder or particulate material in a press causing some compaction, then compressing further, and immediately extruding it, all in one continuous process.

It has been found that certain difficulties arise if one attempts to extrude directly from porous lightly compacted material into a final product.

U.S. Pat. No. 3,805,574—Wessel, shows apparatus which is intended to overcome the problems created by gas, usually air, trapped in the pores between the particulate during the compression and extrusion processes.

U.S. Pat. No. 4,059,896—Osa et al, reveals a two step process for converting aluminum scrap into finished articles in which the particulate aluminum scrap is first compacted to a density of between 1.8 and 2.4 g/cm$^3$ to form a billet. In the process the trapped air is allowed to escape to the periphery of the billet after which it escapes in the second extrusion where the temperature is raised to between 350° and 550° C.

In U.S. Pat. No. 3,559,271—Nilsson, a process of hydrostatically compressing a lightly compacted powder/particulate billet is shown. The billet is compacted to a density of about sixty percent of the theoretically possible density; i.e., the density of a solid billet of the same material. In the process a temporary liquid tight plastic barrier of polyvinyl chloride or varnish is coated on the billet.

U.S. Pat. No. 4,087,893—Satt et al., discloses a process of producing a heat pipe in which a billet is prepared having an interior grooved surface. The entire internal cavity including the grooves is filled with a water soluble salt core. The billet is extruded through the die to reduce the size thereof and then the salt is dissolved and removed leaving a hollow heat pipe.

U.S. Pat. No. 2,123,416—Graham, reveals a method and apparatus for extruding powder and other particulate materials in which the powder or pieces of metal are held in a thin wall metal container which may completely enclose the powder or which may be open at the end. This patent shows the use of an extrusion die having an included angle greater than 90°.

SUMMARY OF THE INVENTION

In summary, this invention is a process of consolidating particulate matter into a homogeneous or composite material comprising: enclosing the unconsolidated particulate material in a can including a surrounding wall and end closures to confine a first volume of material; applying pressure on one end closure while confining the surrounding wall and forcing the other end closure through a convergent die having an included angle of less than about 90°; and continuing the application of pressure on the one end while forcing the surrounding wall through the convergent die and decreasing the first volume of material to a second volume at substantially one hundred percent of the compactable density so that consolidation is complete.

A major application of this invention is to consolidate a composite material consisting of two or more particulate materials, at least one of which consists of short fibers or whiskers which may be typically brittle and much stronger than the remaining particulate matrix materials. (The matrix material may also be in the form of a coating on the fibers or whiskers). In mixtures with fibers, it is important to preserve the initial high length-to-diameter ratio of the fibers as much as possible and, for many end products, to align the fibers along the longitudinal axis of the billet for maximizing strength and elastic modulus of the composite in that direction. This invention permits consolidation of the mixture by incremental radial pressing only within the convergent die and aperture by use of a can which undergoes very little or no plastic deformation upstream of the die. In so doing, the random short fibers are able to rotate and align gradually toward the axial direction of the billet and largely before full density of the compact is achieved. This approach substantially reduces the amount of short fiber breakage that normally occurs in subsequent extrusion. For example, when a fully-dense, axially-pressed billet (such as that made by vacuum-hot-pressing), in which nests of the short fibers are aligned transverse to the axial direction, is extruded and the "locked-in" short fibers are forced to rotate and align toward the axial direction, most fibers are unable to rotate as required to achieve alignment, and they break.

A second application of this invention is to consolidate one or more particulate materials, none of which are short fibers (i.e., with a length-to-diameter ratio greater than about 1). In this case, there is no concern about short fiber breakage or orientation, so preconsolidation of the compact may occur upstream from the convergent die. This is not preferred for compacts containing short fibers. This invention permits the consolidation of the particulate materials by extrusion at lower extrusion ratios (between 1:1 and about 7:1) than the minimum required by conventional extrusion practices (about 8:1 to 10:1) to obtain a sound product free of surface and internal cracks.

A feature of this invention that makes this possible is the use of convergent dies with smaller-than-conventional included angles. Such dies prevent or minimize the development of tensile stresses in the compact within the region of the convergent die lead-in surfaces and especially near the die orifice. Such tensile stresses, which can be sufficient to cause cracks in products extruded from even sound wrought billets, can easily promote cracks in a product extruded from particulate billets where, in effect, preexisting "cracks" or voids between powder particles must be sufficiently closed and bonded to achieve a sound product. In conventional extrusion practices, where flat or large-included-angle convergent dies (90° or more) are typically used, the tensile stresses and the detrimental effects thereof are prevented or minimized only by extruding at a high enough extrusion ratio (greater than about 8:1 to 10:1).

An advantage of this invention for this second application is the dramatic reduction of press forces required to produce a consolidated bar of a given cross sectional area compared to conventional extrusion. A further feature is the decrease in processing time over hot-isostatic pressing (HIP) and vacuum-hot-pressing (VHP) for compacting powder material. Another advantage of this process over HIP and VHP is the achievement of shear deformation and extension of the particle surfaces, which breaks up surface contaminants and produces fresh clean surface material to promote better bonding. Further bonding can be achieved after consolidation, if necessary, by high-temperature diffusion or sintering treatments well known for a given particulate material.

The foregoing and other advantages of the invention will become apparent from the following disclosure in which a preferred embodiment of the invention is described in detail and illustrated in the accompanying drawings. It is contemplated that variations in structural features and arrangement of parts may appear to those skilled in the art without departing from the scope or sacrificing any of the advantages of the invention.

DESCRIPTION OF THE DRAWINGS

FIG. 1 is a schematic elevational sectional view illustrating a prior art method and apparatus for making compacts of particulate material by axial pressing.

FIG. 2 is a schematic elevational sectional view illustrating a prior art isostatic pressure method of making particulate material compacts.

FIG. 3 is an elevational sectional view of the tube or can formed in the first step in the process of the present invention.

FIG. 4 is an elevational sectional view of typical apparatus in which the method of this invention is practiced at the beginning position for the second step in the process of the invention.

FIG. 5 is a sectional elevational view of the apparatus of FIG. 4 during a further advanced and following step of the process.

FIG. 8 is a schematic cross-sectional view of a "streamlined" die and container that may be used in the practice of this invention.

FIG. 9 is a cross-sectional view of a beginning enclosure of a product made by another embodiment of the process of this invention.

FIG. 10 is an elevational sectional view of the enclosure used in another embodiment of the invention.

FIG. 11 is an elevational sectional view of the enclosure used in still another embodiment of the invention.

DETAILED DESCRIPTION OF THE INVENTION

Figure 6:
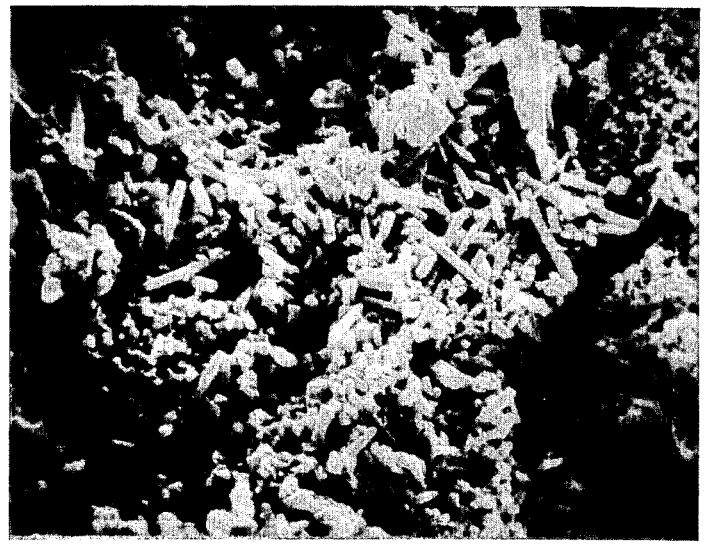
FIG. 6 is a longitudinal cross-sectional photomicrograph of a consolidated billet comprising a blend of short-fiber-reinforced composite material which was compacted in a manner equivalent to the prior art of axial pressing. The fibers are mainly perpendicular or transverse to the longitudinal axis.

Referring to FIG. 1, compacts of particulate material such as powders or powders mixed with fibers have in the past been compacted by pressing a portion of the material 20 by a ram 21 moving in a bore or container 22 on an axial center line 23 against a base plate 24, or another ram similar to ram 21. When the process is carried out in a vacuum and at elevated temperature, it is conventionally known as "Vacuum-Hot Pressing". In this procedure compacts are usually made into cylindrical billets of a diameter D and a thickness L. In this practice, the L/D is limited to about 1, because of the high container wall friction, resulting in nonuniform compact density along its length. Various densities can be achieved depending on the force exerted to the ram 21, and the limit is dependent upon the force of the press apparatus which moves the ram 21, the strength of the container 22, and the strength of particulate material 20. The press may be operated with hydraulic forces on the ram, or it may be actuated with mechanical forces, the latter being exerted by a crank and piston in well known fashion.

Referring to FIG. 2, in another prior art method compacts or billets 30 are made by first lightly forming a billet of diameter D and thickness L and then encasing the billet in a liquid impervious coating such as varnish or polyvinyl chloride. Metal cans and elastomeric containers have been also used for encasing the material, as discussed in the Background Section, supra. Following this the billet 30 is subjected to isostatic pressure (equally from all sides) such as by a gas or liquid. This may be done hot (HIP) or cold (CIP), the hot process being preferred for achieving maximum density and properties.

When the material for the formation of the billet is a powder, orientation of the particles is not important and only density and properties are the major considerations. On the other hand, if the particulate material is a blend of powder and fibers having a length L to cross-sectional diameter D ratio (L/D) greater than two, it is often desirable to orient the fibers in the longitudinal direction of the billet. This is because if the length dimension of the fibers is so oriented, the final product will have enhanced behavior and physical properties.

However, by techniques shown in FIGS. 1 and 2 there is no possibility for orienting the fibers along the longitudinal axis during the compaction process. The process of FIG. 1 orients the fibers along the transverse direction of the billet, and the process of FIG. 2 merely preserves the random orientation of the fibers that existed prior to compaction.

After billets 20 or 30 are made, they may be used in various ways including machining, forging, and frequently extrusion. When billets are further extruded, the process includes forcing the material through a die causing elongation on the longitudinal axis of the extrusion process. If the starting density is one hundred percent the elongation in an extrusion process will be in a ratio to the finished diameter D such that the volume remains the same. Although the term "extrusion" has often loosely come to mean a process where material of a larger diameter is forced through a die having an aperture of smaller diameter, compaction may be taking place in the process so that density approaches or reaches one hundred percent only at the point where the material moves through the aperture in the die. In such circumstances, true extrusion does not take place and the process remains substantially a compaction process which is carried out with continuous motion. If full density is reached within the die convergence before reaching the aperture, then some extrusion occurs and the extrusion ratio is in proportion to the cross-sectional area of the billet at the diameter at which full density is first obtained.

Referring to FIG. 3 the first step in the process of this invention is to enclose the unconsolidated particulate material 35 from which a compact or billet is to be made, in a beginning enclosure 34. The unconsolidated particulate material need not be precompressed by CIP or other methods but may have a loose packing density of less than 70 percent of the possible compactable density, although other densities may be used. The unconsolidated particulate material may be one hundred percent powder proportioned particles 36, or it may be a blend including fiber particles 37 which have a length to cross-sectional diameter ratio (L/D) greater than about two, and as much as fifty or more. As will be explained later, such blended unconsolidated particulate material 35 will produce final products which have special properties that may be advantageously used for certain purposes.

The enclosure 34 includes a can or tube 38 which is generally symmetrical in cross-section around a central axis 43 having two opposite end closures 39 and 40. The end closures 39, 40 may be fastened in place by welds 41 or other means. The unconsolidated particulate material 35 may be cold or hot vacuum-degassed while in the enclosure 34, if required to improve properties, by means of a small tube fastened over an appropriately-sized and -positioned hole in end closure 39 or 40, according to well known means for this operation.

The term "can" as used herein is not meant to have any implication that it is made from any particular material, such as metal; but rather is meant to include a jacket or enclosure of any suitable material for the forces, temperature, and compact material being processed.

Referring to FIG. 4 the second step of the process of this invention includes applying pressure on one end closure 39 of the enclosure 34 and forcing the other end closure 40 through a convergent die 47.

In typical apparatus 44 for carrying out this process step the enclosure 34 is situated in a closely fitting container or bore 45. An extended end 42 of the tube 38 may be deflected into the entrance of the tapered die 47 when the enclosure 34 is inserted in the container 45 by relatively incidental vertical force downward.

A lubricant can be provided between the container 45 and the can 38 and between the face 49 and can 38 to minimize friction forces and compaction loads. In some cases where it is desired to increase the radial compressive stresses imposed on particulates in the die convergence for improved consolidation and bonding, this can be done by increasing the friction between (a) both the face 49 and aperture 48 and (b) the can 38 by eliminating or minimizing the lubricant, roughening the interface, or other well known means.

The die 47 includes a conical face 49 and an included angle of convergence $\theta$ which is symmetrical about the central longitudinal axis 50 of the apparatus 44. The container 45 and die 47 are supported on a base or other means 51.

A ram 46, which is adapted to move on the axis 50 in the container 45, is forceably moved to apply pressure against the one end closure 39 forcing the can 38 downward through the die 47 along the face 49 and out the aperture 48. The other end closure 40 is radially compressed to fill the aperture 48 in conjunction with the surrounding tubular wall, as shown in FIG. 5.

As further shown in FIG. 5, in the next step of the process of this invention, the application of pressure on the one end closure 39 forces the surrounding can 38 to radially compress progressively through the die 47 and out the aperture 48.

As the second step of the process is carried out by forcing the enclosure 34 downward through the die, forming a billet, and out the aperture 48, the second end closure 40 is compressed radially toward the center line 50, and the can 38 uniformly and radially compresses the particulate material 35 to reach a density of about one hundred percent as it reaches and passes through the aperture 48. The size of aperture 48 for the incremental radial pressing process depends on the starting density of the compact and the level of final density or degree of extrusion beyond one hundred percent density desired. For example, if the starting density were about 40 percent, the aperture 48 would be sized to achieve about 60 percent reduction of the cross-sectional area of the starting compact to achieve 100 percent density, assuming the length of the compact before and after densification remains essentially the same.

Because of the continued downward travel, forced by pressure against the other end closure 39, and because of the movement of the surrounding wall of the can/tube 38, there is movement of the material 35, in the third step of the process. This continuously moving compaction process can cause compaction to take place without the required forces of true extrusion and with a material flow which tends to align the fiber components of the blend of particulate material, so that the compacted material moving out through the aperture 48 is a product with more than a random degree of longitudinal orientation of the fiber component 37.

The end closure 39 can be made thick enough, or supplemented by a thick disk above it, so that by its (or their) ejection, the densified material 35 is completely compacted.

Referring to FIG. 6, a composite of a blend of 25 volume percent of silicon carbide whiskers in aluminum material was compacted in a typical prior art type process where consolidation takes place by axial pressing. The longitudinal axis of the compacted billet is vertical. It is seen that the long fibers are predominantly transverse to the longitudinal axis of the billet. The photomicrograph is at a magnification of 2500X.

Figure 7:
FIG. 7 is a longitudinal cross-sectional photomicrograph of a compacted billet comprising the same composite material shown in FIG. 6 which were compacted according to the process of this invention. The short fibers here are oriented mainly toward or parallel to the longitudinal axis.

Referring to FIG. 7, a similar material was compacted according to the process of this invention where no consolidation takes place upstream of the die and the consolidation takes place by the radial pressing process. The photomicrograph (also 2500X) shows an axial orientation (vertical in the picture) which is the axis of the moving ram, while radial pressing is taking place largely perpendicular thereto. The photomicrograph shows the increased axial orientation of the fibers in the compacted billet.

A principal feature of this invention for consolidating particulate materials which contain fibers or whiskers is that the supporting can or tube surrounding the particulate materials undergoes very little and preferably no upsetting or shortening by plastic deformation upstream from the convergent die. This feature prevents undesirable preconsolidation of the mixture prior to being acted upon by the converging die. Thus, consolidation of the mixture occurs primarily by incremental radial pressing being introduced by the can as a result of its interaction with the converging die. Such incremental radial pressing causes the short fibers or whiskers to align gradually toward the axial direction of the billet and, importantly, prior to full densification of the matrix material. If the surrounding can were allowed to upset or shorten excessively upstream from the die, then the undesirable axial-pressing mode would be introduced, thus orienting the fibers along the transverse direction of the billet while the matrix is being predensified. Predensification of the matrix tends to lock nests of the short fibers together, and attempts to reorient them in the axial direction by subsequent incremental radial pressing or extrusion will fall short of optimum because the fibers are less free to undergo the rotation required for axial realignment. Such interference to fiber rotation will cause the brittle fibers to break, thus reducing the L/D of the fibers substantially.

For consolidating particulate materials which do not contain short fibers or whiskers, the surrounding and supporting can may be designed to either remain rigid or plastically upset upstream of the die during consolidation, depending on the product requirements and press capacity available. If press forces are limited, it is preferred to use a can that remains largely rigid so that preconsolidation upstream of the die is minimized, thereby permitting full consolidation and perhaps some extrusion to occur only in the convergence and aperture of the die. In so doing, the rigid can serves to reduce the force required to consolidate a product of a given diameter by reducing the effective extrusion ratio compared to what it would be if the can were allowed to plastically upset and full consolidation occurred above the die.

Another principal feature of the process of this invention is the compaction through a convergent die which has a relatively smaller angle of convergence than the conventional prior art practice of extrusion. It is the conventional prior art practice to use dies having an included angle $\theta$ of 90° or greater in a typical conical or flat configuration. In the practice of this invention the angle of convergence $\theta$, which may be a conical form as shown in FIGS. 4 and 5, is less than 90°. In the preferred practice of the invention the included angle $\theta$ is between about 5° and 60°, good results having been obtained with an angle of 15° for consolidation of particulate mixtures containing whiskers or short fibers. Small included angles less than about 60° are preferred because they (a) provide a longer and more gradual path for fiber rotation and alignment prior to full densification of the matrix, (b) require less axial ram force to reduce the can diameter a given amount, (c) allow greater reductions of the can diameter before excessive can upsetting occurs upstream from the die, and (d) prevent or minimize tensile stresses from developing within the converging particulates during densification, especially near the die aperture where full densification is approached.

The form of convergence of the die need not be totally conical, but alternatively may be a "streamlined" shape such as that shown in FIG. 8 where the die 47' is formed with tangent radii R and R'. In this configuration, the radii R and R' are tangent to an essentially conical region 49' between them, to the container 45', and to the aperture 48'. In such a configuration, the conical region has an included angle $\theta$ of less than 90°. In the radial pressing process of this invention the exact shape of the "streamlined" dies may vary, it being understood that the significant feature is the general small angle of convergence being less than 90° and preferrably in the range of 5° to 60°. The relatively large radii at the entry and exit points allow for a more gentle change in direction than that in a plain conical die, thus reducing axial load requirements on the can and providing a longer, more gradual path over which to align the fiber components of a particulate blend.

The process of this invention has particular advantages when blended materials are used in which the fiber component is a material having a high tensile strength and elastic modulus relative to the powder components. For instance, the compaction of silicon carbide fibers in an aluminum powder produces a product having an unusually high tensile strength an elastic modulus in the final billet on the longitudinal axis. This occurs because of the combination of the orientation of the fibers and their relatively high tensile strength and elastic modulus in comparison with aluminum.

It has been found that especially good results can be achieved when this combination of silicon carbide fibers and aluminum is consolidated in a steel tube or can at about 500° C. during the process of this invention, although other enclosure materials may be used. Cans of the same approximate size and wall thickness made from aluminum and copper alloys did not work under the same conditions because of gross plastic upsetting of the can wall. The can material is selected on the basis of its ability to resist upsetting or shortening upstream of the converging die for consolidating particulates containing short fibers. The can wall thickness is preferrably minimized to maximize the starting billet diameter for a given container bore diameter. The minimum can wall thickness is a function of the (a) unconsolidated or loose packing density of the compact, (b) amount of inward radial motion of the can required to achieve full densification of the billet, (c) can wall strength, (d) axial load required to reduce the can diameter the prescribed amount independent of the compact, and (e) extra axial load required to radially press the compact to full density. The axial pressing load on the can may be reduced, if necessary to minimize wall thickness further, by simultaneously applying a tensile load to the front of the can.

In the usual method of this invention, the can is heated together with the particulate material to the desired consolidation temperature. In some cases, however, it may be desirable to use two close-fitting cans, the inner can of thin wall and end closures being evacuated and heated to the desired consolidation temperature and quickly dropped into the outer can of standard design shown in FIG. 3, except that the top enclosure 39 does not require welding. The outer can is initially at a much lower temperature and preferably insulated well enough from the inner can so that the outer can may retain its greater strength and stiffness made possible by the lower temperature. Such properties help the outer can with a minimal wall thickness to resist upsetting upstream of the die when high consolidation temperatures are required. The inner and outer cans may be made from two different materials, if desired.

Although the process may sometimes be carried out "cold"; i.e., at room temperature to consolidate compacts without bonding, it is often used to consolidate at elevated temperatures to minimize fiber damage and maximize bonding particulates. For example, excellent results are achieved when the particulate material 35 and the beginning product enclosure 34 are preheated close to and near the solidus temperature of the matrix materials being used. For instance, temperatures in the range of 450° C. to 550° C. have been found useful for the aluminum-matrix material discussed in the example above.

Referring to FIG. 9, a typical "I Beam" shape product may be made by the process of the invention in an embodiment wherein the product material to be compacted 35' is enclosed in a first inner can 60 having a cross-sectional configuration of a typical I Beam. The can 60 is surrounded with a working powder such as a ceramic and/or graphite 61. The working powder 61 is surrounded by a second can 38' which is formed between opposite end closures previously shown in FIGS. 3, 4, and 5.

The process of forming the compact in this embodiment is essentially the same as that previously described for the previous embodiment. When the can 38 is forced through a round (cross-section) die, the working powder and/or graphite 61 is radially compressed uniformly around the inner can 60 which compresses the beginning material 35 to substantially one hundred percent density.

When the processing is complete, the second can 38', working powder 61 and inner can 60 are stripped from the composite leaving the material in the final form of an I Beam shape. Compacts of other shapes may be formed in the same way.

It is a common practice to make and extrude hollow wrought billets; i.e., having an annular cylindrical shape in apparatus and methods described in the prior art. In these prior art processes and apparatus, a mandrel is provided through the billet and aperture of the die. The mandrel acts as an internal form for the hollow central opening in the billet and extruded product. This invention is equally applicable to making such hollow consolidated products and composites. As shown in FIG. 10 in this embodiment, the enclosure 34' includes an annular central hollow core 70 which is formed to fit on the mandrel so that the enclosure 34' is a hollow annulus can 71 including the particulate material 35, either powder 36 or mixed with fibers 37.

In still another embodiment of the invention as shown in FIG. 11, continuous fibers 65 are positioned longitudinally in a matrix 36' in an enclosure 34" having end closures 67 and 68 at opposite ends of a can 69. When such an enclosure 34" is radially compressed by pushing, the continuous fibers maintain their longitudinal alignment and will not be subjected to high tensile stresses that would tend to break their continuous length. In the conventional practice, particulate or melt-infiltrated compacts containing longitudinally continuous fibers are difficult to consolidate and are typically produced by pulling tubes through dies with the continuous fibers stretched within the tubes. The conventional process is subject to the problems of tensile breakage of the fibers, the need to make and firmly attach a long pointed leader to the tube in order to pull the tube through the die, and tensile breakage of the point of the tube by the means that are used to pull it through the die. Such problems do not occur in the process of this invention.

It has been found in the operation of the process of this invention that compacted particulates and composite materials can be manufactured with substantially lower ratios of starting compact cross-sectional area to product cross-sectional area; i.e., extrusion ratio. For instance, the table below shows the dramatic possibilities obtainable for consolidation of high alloy steel particulates at a temperature of about 1000° C.

TABLE I

COMPARISON BETWEEN LOW-RATIO EXTRUSION AND CONVENTIONAL EXTRUSION PROCESSES FOR CONSOLIDATION OF HIGH-ALLOY STEEL PRODUCTS

| Product Dia. Desired | Extrusion Process | Start Billet Dia. | Estimated Process Pressure | Estim. Press Force Req'd Tons | Extrusion Ratio | Type of Can |
|---|---|---|---|---|---|---|
| 7 in. | Conventional | 20 in. | 100 ksi | 15,700 | 8:1 | Nonrigid |
| 7 in. | Low-Ratio | 10 in. | 25 ksi | 1,000 | 1:1 | Rigid |
| 7 in. | Low-Ratio | 10 in. | 35 ksi | 1,400 | 2:1 | Nonrigid |
| 3 in. | Conventional | 8.5 in. | 100 ksi | 2,840 | 8:1 | Nonrigid |
| 3 in. | Low-Ratio | 4.25 in. | 25 ksi | 180 | 1:1 | Rigid |
| 3 in. | Low-Ratio | 4.25 in. | 35 ksi | 250 | 2:1 | Nonrigid |
| 3 in. | Low-Ratio | 6.7 in. | 80 ksi | 1,400 | 5:1 | Nonrigid |
| 3 in. | Low-Ratio | 7.9 in. | 87 ksi | 2,150 | 7:1 | Nonrigid |

In compacting particulates without short fibers, thinner cans may be used because it is not always necessary that the can remain rigid above the die since orientation of fibers is not of concern. In the above table, examples are given for making bar products of two different diameters—7 and 3 inches—from powder that is assumed to have a starting packing density of 50 percent. When a rigid can is used above the die, a nominally 4.25 in. diameter starting billet is reduced to a 3 in. diameter bar product of full density at an extrusion ratio of 1:1 (i.e., zero extrusion beyond full density). This would require a force of about 180 tons.

When a nonrigid can above the die is used, the same starting compact is largely preconsolidated above the die and the densified billet is then extruded through the die at a ratio of essentially 2:1. This approach would require about 250 tons, which is still dramatically lower than the 2840 tons required to produce a sound product at a ratio of 8:1 by conventional extrusion. Even if extrusion ratios of 5:1 or 7:1 are desired, the press force required is still much lower than that needed by the conventional extrusion method.

Also in this practice the enclosure member which enters the die first; i.e., the can nose, may be constructed of a heavier cross section to produce higher pressures at the beginning of the compaction process, assuring that there be complete compaction in the beginning section of the extruded billet. The same effect can be created by the use of a hardened plug at the beginning of the enclosure. Another alternative is to use a less expensive particulate material at the leading end of the enclosure, which may be readily distinguished and scrapped from the product.

The advantages of the process of this invention include the following:

A. It is possible to consolidate small and intermediate diameter (size) products at less cost than by HIP (hot isostatic pressing) or VHP (vacuum hot pressing).

B. It is possible to make solid and hollow consolidated products (rounds and shapes) of higher L/D (e.g., about 8:1) than is possible by VHP (about 1:1).

C. It is possible to start with lower packing densities (e.g., less than 60%) than with HIP, thus eliminating the additional step of CIP (cold isostatic pressing) which is often required of HIP.

D. Long products can be made straighter and more dimensionally uniform along their lengths than that obtainable by HIP.

E. The process avoids the need of gas tightness in the can during the consolidation step as required in the HIP process.

F. It is possible to obtain faster cycle rates through the apparatus than with HIP or VHP for many types of high L/D products, including large-diameter bars or hollows.

G. It is possible to have better properties in the finished product than that obtainable by HIP because of shear deformation of the particulates and the breakup of surface contaminants due to low-ratio extrusion.

H. Lower press forces are required than with conventional extrusion because the minimum extrusion ratios to get a sound product are lower (less than 8:1) with the use of smaller included die angles (less than 90 degrees).

It is herein understood that although the present invention has been specifically disclosed with the preferred embodiment and examples, modification and variation of the concepts herein disclosed may be resorted by those skilled in the art. Such modifications and variations are considered to be within the scope of the invention and the appended claims.

What is claimed is:

1. A method of consolidating particulate materials into a compact, comprising:
   a. enclosing the unconsolidated particulate material in a supporting can including a surrounding wall and end closures to confine a first volume of particulate material;
   b. applying pressure on one end closure while confining the surrounding wall and forcing the other end closure through a die with a convergent portion having an included angle of convergence of less than about 90°; and
   c. continuing the application of pressure on the one end while forcing the surrounding wall through the convergence of the die to provide incremental radical compression of the particulate material as it passes through the die, decreasing the first volume of unconsolidated particulate material to a second volume of particulate material which becomes smaller than the first volume in the convergent portion, and to produce a compact with substantially one hundred percent of the possible compactable density of the consolidated material, the area of cross-section of the particulate compact being between about one and seven times the area of cross-section of the compact passing through the aperture of the die.

2. A method according to claim 1 wherein the included angle of convergence is between 5° and 60°.

3. A method according to claim 1 wherein the included angle of convergence is about 15°.

4. A method according to claim 1 wherein the convergence die is streamlined with tangential radii at entry and exit points.

5. A method according to claim 1 wherein the wall of the container is tubular.

6. A method according to claim 1 wherein the unconsolidated particulate material of the first volume is packed to a density of less than about 70 percent of the possible compactable density.

7. A process according to claim 1 wherein the unconsolidated particulate material includes particles having a length-to-diameter ratio of more than about two.

8. A method according to claim 1 wherein the unconsolidated particulate material includes particles having a length-to-diameter ratio of about 2 to 50.

9. A method according to claim 1 wherein the can is constructed of steel and the unconsolidated particulate material includes silicon carbide whiskers mixed with aluminum.

10. A method according to claim 1 wherein the can of unconsolidated particulate material is a metal and is heated to a temperature of close to the solidus temperature of the particulate material before step (b) begins.

11. A method of consolidating particulate material into a compact comprising:
    a. enclosing and heating the unconsolidated particulate material in a first can including a surrounding wall and end closures to confine a first volume of particulate material;
    b. inserting the first heated can in a second unheated can substantially immediately before applying pressure on one end closure while confining the surrounding wall and forcing the other end closure through a die with a convergent portion having an included angle of convergence of less than about 90°; and
    c. continuing the application of pressure on the one end while forcing the surrounding wall through the convergence of the die to provide incremental radial compression of the particulate material as it passes through the die, decreasing the first volume of unconsolidated material to a second volume of particulate material which is smaller than the first volume in the convergent portion, and to produce a compact with substantially one hundred percent of the possible compactable density of the consolidated material, the area of cross-section of the particulate compact being between about one and seven times the area of cross-section of the compact passing through the aperture of the die, the second unheated can acting to resist upsetting of the first heated can upstream of the die.

12. A method according to claim 1 wherein the can and the consolidated material are each an annulus.

13. A method according to claim 1 wherein the can is selected to have a strength and wall thickness sufficient to resist upsetting or collapse upstream of the die during process steps b and c.

14. A method according to claim 13 wherein a tensile load is simultaneously applied to the other end closure in step (b).

15. A method of compacting a particulate material into a compact in a press having a ram which is moveable in a bore that is co-axial with a convergent die having an aperture at one end, comprising:
   a. enclosing unconsolidated particulate material in a supporting can including a tubular surrounding wall of substantially the same diameter but slightly less than the bore and with the can having two end closures to confine a first unit volume of particulate material;
   b. moving the ram against one end closure while confining the surrounding wall within the bore and forcing the other end closure through the convergent die with a convergent portion having an included angle of about 5° to 60°; and
   c. continuing the movement and application of the ram on the one end closure and forcing the surrounding wall through the convergence and aperture of the die to provide incremental radial compression of the particulate material as it passes through the die while decreasing the first unit volume of material in the convergent portion to a second unit volume of material which is smaller than the first unit volume to produce a compact with substantially one hundred percent of the possible compactable density of the consolidated material, the area of cross-section of the particulate compact being between 1 and 7 times the area of cross-section of the compact passing through the aperture of the die.

16. A method according to claim 15 wherein the area of cross-section of the ram is between 1 and 5 times the area of cross-section of the aperture in the die.

17. A method of consolidating a first particulate material into a compact with or without short fibers into a shape comprising:
   a. enclosing the unconsolidated first particulate material in a first inner supporting can of the desire shape including a surrounding wall and end closures to confine a first volume of material, and enclosing a second unconsolidated particulate material as a pressure-transmitting medium around the first enclosure in a second supporting can including a second surrounding wall and end closures to confine a second volume of particulate material;
   b. applying pressure on the end closures at one end while confining the second surrounding wall and forcing the other end closure through a die with a convergent portion having an included angle of less than about 90°; and
   c. continuing the application of pressure on the first end closures forcing the second surrounding wall through the convergence of the die to provide incremental radial compression of the particulate material as it passes through the die while decreasing the first volume of particulate material in the convergent portion to a second volume of material which is smaller than the first volume to produce a compact with substantially one hundred percent of the possible compactable density of the consolidated first material, the area of cross-section of the compact of the first material being between about one and seven times the area of cross-section of the compact passing through the aperture of the die.

18. A method of consolidating particulate material or melt-infiltrated matrix material with continuous fibers extending longitudinally through the material into a compact comprising:
   a. enclosing the unconsolidated particulate material or melt-infiltrated matrix material in a supporting can with the continuous fibers extending longitudinally through the material, the can including a surrounding wall and end closures to confine a first volume of material;
   b. applying pressure on one end closure while confining the surrounding wall and forcing the other end closure through a die with a convergent portion having an included angle of convergence of less than about 90°; and
   c. continuing the application of pressure on the one end while forcing the surrounding wall through the convergence of the die to provide incremental radial compression of the particulate material as it passes through the die and decreasing the first volume of unconsolidated material to a second volume of material which is smaller than the first volume in the convergent portion, and to produce a compact with substantially one hundred percent of the possible compactable density of the consolidated material, the area of cross-section of the particulate compact being between about one and seven times the area of cross-section of the compact passing through the die.

* * * * *